(12) United States Patent
Ma et al.

(10) Patent No.: US 8,906,461 B2
(45) Date of Patent: Dec. 9, 2014

(54) RAPID DRYING LACQUERS CONTAINING TRIBLOCK COPOLYMER FOR RHEOLOGY CONTROL

(75) Inventors: Sheau-Hwa Ma, West Chester, PA (US); Renee J. Kelly, Media, PA (US)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 260 days.

(21) Appl. No.: 12/823,402

(22) Filed: Jun. 25, 2010

(65) Prior Publication Data

US 2010/0286313 A1    Nov. 11, 2010

Related U.S. Application Data

(63) Continuation-in-part of application No. 11/155,440, filed on Jun. 17, 2005, now abandoned.

(51) Int. Cl.
| C09D 153/00 | (2006.01) |
| C08F 293/00 | (2006.01) |
| C08F 295/00 | (2006.01) |

(52) U.S. Cl.
CPC .......... *C08F 293/005* (2013.01); *C09D 153/00* (2013.01)
USPC ...................... 427/372.2; 427/384; 427/385.5; 524/543; 525/50; 525/70; 525/88; 525/242; 525/244; 525/298; 525/299

(58) Field of Classification Search
USPC ................... 427/372.2, 384, 385.5; 524/543; 525/50, 70, 88, 242, 244, 298, 299
See application file for complete search history.

(56) References Cited

U.S. PATENT DOCUMENTS

| 2,585,160 | A | 6/1971 | Miller et al. |
| 4,242,243 | A | 12/1980 | Antonelli et al. |
| RE31,309 | E | 7/1983 | Antonelli et al. |
| 4,680,352 | A | 7/1987 | Janowicz et al. |
| 4,692,481 | A | 9/1987 | Kelly |
| 4,722,984 | A | 2/1988 | Janowicz |
| 5,030,726 | A | 7/1991 | Noriyuki et al. |
| 5,045,616 | A | 9/1991 | Rauterkus et al. |
| 5,219,945 | A | 6/1993 | Dicker et al. |
| 6,291,620 | B1 | 9/2001 | Moad et al. |
| 2004/0170767 | A1* | 9/2004 | Flosbach et al. ........... 427/385.5 |
| 2005/0085592 | A1* | 4/2005 | Taniguchi et al. ............ 525/242 |
| 2006/0100350 | A1 | 5/2006 | Barsotti et al. |
| 2006/0100351 | A1 | 5/2006 | Butera et al. |

FOREIGN PATENT DOCUMENTS

| WO | 99/42505 | 8/1999 |
| WO | 99/62978 | 12/1999 |
| WO | 00/40630 | 7/2000 |
| WO | 03/070843 A1 | 8/2003 |
| WO | WO-03068836 A1 * | 8/2003 |

OTHER PUBLICATIONS

Lambourne, R. et al "Paint and Surface Coatings-Theory and Practice $2^{nd}$ Edition" Woodhead Publishing, 1999 pp. 1-6 and 190-192.*

* cited by examiner

*Primary Examiner* — Irina S Zemel
*Assistant Examiner* — Jeffrey Lenihan
(74) *Attorney, Agent, or Firm* — Ingrassia Fisher & Lorenz, P.C.

(57) ABSTRACT

This invention relates to rapid drying lacquers that are particularly useful for automotive OEM refinish applications. The lacquer includes a novel acrylic triblock copolymer as a replacement material for all or part of the cellulose acetate butyrate binder component. This invention is also directed to a process for producing coatings from the rapid drying lacquers. These lacquers are especially useful in providing chip and humidity resistant coatings, especially metallic effect coatings, having excellent adhesion and down flop or metallic effect.

22 Claims, No Drawings

RAPID DRYING LACQUERS CONTAINING TRIBLOCK COPOLYMER FOR RHEOLOGY CONTROL

CROSS-REFERENCE TO RELATED APPLICATION

This application is a continuation-in-part of U.S. application Ser. No. 11/155,440, filed on Jun. 17, 2005 now abandoned.

FIELD OF THE INVENTION

This invention relates to coating compositions and in particular to rapid drying lacquer coating compositions that are particularly useful for automotive refinishing.

BACKGROUND OF THE INVENTION

To refinish or repair a finish on vehicle, such as a basecoat/clearcoat finish on automobile or truck bodies, different fast-drying coating compositions have been developed. A number of pigmented and clear air-dry acrylic lacquers have been used in the past to repair basecoat/clearcoat finishes, but none meet the rapid drying times that are desired, while also meeting today's performance requirements, such as excellent stone-chip resistance, humidity resistance, intercoat adhesion, and appearance.

A key concern to a refinish customer which is typically the vehicle owner is that the coating in use has excellent durability and weatherability and an attractive aesthetic appearance.

Another key concern of the automobile and truck refinish industry is productivity, i.e., the ability to complete an entire refinish operation in the least amount of time. To accomplish a high level of productivity, any coatings applied need to have the ability to dry at ambient or slightly elevated temperature conditions in a relatively short period of time. The term "dry" means that the resulting finish is physically dry to the touch in a relatively short period of time to minimize dirt pick-up, and, in the case of the basecoat, to allow for the application of the subsequent clear coat.

It is also desirable to have quick drying basecoats for additional reasons. If the applied basecoat composition layer has not dried sufficiently before the clearcoat composition is applied, then the application of the clearcoat will disturb the basecoat layer and the appearance of the basecoat will be adversely affected. For basecoats containing special effect pigments, e.g., flake pigments such as metallic and pearlescent flakes, the metallic flake control and metallic appearance (or downflop) of these basecoats will suffer due to disturbance of the flake pigment by intermixing of the coating layers at their interface. "Downflop" refers to a phenomenon associate with metallic effect coatings wherein the color varies with the angle of view to provide a three dimensional metallic effect on the surface of the vehicle.

Cost and volatile organic solvent content are further concerns in formulating automotive refinish coating compositions. For example, cellulose acetate butyrate (CAB) resins have been used to shorten the dry to handle time and as rheology control additives to enhance metallic flake control and other properties in refinish basecoats, but coating compositions containing these CAB material require an undesirable high amount of organic solvent. In addition, these CAB materials are relatively expensive and require added steps in the coatings manufacturing process. The CAB materials are also specialty products that are not widely manufactured.

It would be advantageous, therefore, to have a lacquer coating composition, especially a refinish basecoat lacquer, having a short tack-free drying time at ambient temperature conditions, good metallic flake control and appearance, that is less expensive, that has a reduced amount of regulated emissions, and has the ability to form a finish with excellent chip and humidity resistance and adhesion. The novel composition of this invention have the unique combination of properties desired.

SUMMARY OF THE INVENTION

This invention is directed to a coating composition, especially to a lacquer coating composition, comprising a film-forming binder and a volatile organic liquid carrier, wherein the binder contains, preferably as a replacement for all or part of the cellulose acetate butyrate component, a uniquely segmented triblock copolymer. More particularly, the tri-block copolymer is an ABA'-block copolymer, wherein the ABA' block copolymer has a weight average molecular weight of about 5,000 to 200,000 and contains a polymeric A block, a polymeric B block, and a polymeric A' block; wherein:

(a) the polymeric A block is of polymerized ethylenically unsaturated monomer(s);

(b) the polymeric B block is of a polymerized ethylenically unsaturated monomer(s); and (c) the polymeric A' block is of polymerized ethylenically unsaturated monomer(s); and further wherein the polymeric A block, polymeric B block, and polymeric A' block of the block copolymer, are linearly attached to each other, in the order given or in reverse order, each at a single point thereof;

the A and A' blocks have the same or similar composition and the B block, which is disposed between the A and A' blocks, has a different composition from the A and A' blocks;

the A and A' blocks differ from the B block by the presence, on the A and A' blocks, of one or more functional groups that are capable of interacting with each other or hydrogen (H) bonding with each other for the formation of a reversible network; and the functional groups are selected from at least one of the group consisting of carboxylic acid, hydroxyl, urea, amide, and ethylene oxide groups, or mixtures of any of the above.

Preferably, the dissimilar B block disposed between the A' and A' blocks is a non-functional block, essentially free of functional groups.

The lacquer composition is most suited for use as a pigmented basecoat lacquer in automotive refinish applications, on top of which a transparent (clear) topcoat is applied.

While this composition is preferably used as a lacquer coating which dries via solvent evaporation absent any substantial crosslinking occurring, it optionally may contain a polyisocyanate crosslinking agent for further improved film properties.

This invention is further directed to a process for producing a coating on the surface of a substrate, such as a vehicle body or part thereof, wherein the process comprises:

applying a layer of a lacquer coating composition on the substrate surface, which may be previously primed or sealed or otherwise treated, the lacquer comprising the aforesaid composition; and drying the layer, preferably at ambient conditions, to form a coating on the surface of the substrate, on top of which a clearcoat can be applied.

Also included within the scope of this invention is the triblock copolymer composition formulated for use in the lacquer and a substrate coated with the lacquer coating composition disclosed herein.

DETAILED DESCRIPTION OF THE INVENTION

As used herein:

"Lacquer" means a coating composition that dries primarily by solvent evaporation and does not require crosslinking to form a film having the desired physical properties.

All "molecular weights" are determined by gel permeation chromatography (GPC) using polystyrene as the standard.

"Tg" (glass transition temperature) of the polymer can be measured by differential scanning calorimetry (DSC) or it can be calculated as described by Fox in Bull. Amer. Physics Soc., 1, 3, page 123 (1956).

"Acrylic polymer" means a polymer comprised of polymerized "(meth)acrylate(s)" which mean acrylates and methacrylates, optionally copolymerized with other ethylenically unsaturated monomers, such as acrylamides, methacrylamides, acrylonitriles, methacrylonitriles, and vinyl aromatics such as styrene.

The present invention is directed to a pigmented or clear air-dry lacquer, preferably an acrylic lacquer, suited for various coating processes, such as automotive OEM and automotive refinish. The novel lacquer is particularly well suited for use in automotive refinishing, particularly as a colored refinish basecoat used for repairing or refinishing colored basecoat/clearcoat finishes on auto and truck bodies.

Advantageously, the air-dry lacquer coating compositions formed have excellent physical properties, such as excellent chip and humidity resistance and intercoat adhesion, without sacrificing desired fast dry properties at ambient temperatures and overall appearance, such as DOI (distinctness of image) and HOB (head on brightness).

The lacquer coating composition of this invention preferably contains about 5 to 90% by weight, based on the weight of the coating composition, of a film-forming binder containing an ABA' triblock polymer, preferably an acrylic polymer, as a replacement for all or part of the cellulose acetate butyrate (CAB) resin in the binder and correspondingly about 10 to 95% by weight, based on the weight of the coating composition, of a volatile organic liquid carrier and optionally contains pigments in a pigment to binder weight ratio of about 0.1/100 to 200/100.

ABA' Triblock Copolymer

The ABA' triblock copolymer, which also forms part of this invention, used herein as part of the film forming binder has a weight average molecular weight of 5,000-200,000 and preferably about 10,000-100,000, and more preferably in a range from about 15,000-80,000.

The A and A' blocks of the ABA' block polymer have the same or similar composition and both have at least one interactive functional group described below.

By the "same" composition, it is meant that the A and A' blocks are prepared from the same set of monomers, same monomer ratios, and contain the same type interactive functional groups in the same concentration. By "similar" composition, it is meant that both the A and A' blocks still contain at least one interactive functional group and serve the same network-forming function, but the monomer set, monomer ratio, type of functional groups, and/or concentration of functional groups may be different in each block.

As to the B block, this block is preferably disposed between the A and A' blocks and preferably is a non-functional block that contains mostly polymerized non-functional monomers.

As indicated above, the A and A' blocks differ from the B block by presence of interactive functional groups. The functional groups used in the A and A' blocks are capable of interacting/H-bonding with each other for the formation of a network that is sensitive to shear force, temperature, or pH. The B block is preferably essentially free of functional groups.

The interactive/H-bonding functional groups are preferably selected from at least one of the following groups 1 to 6:
1) Hydroxyl groups (e.g., primary or secondary hydroxyl)
2) Acid groups (e.g., carboxyl groups);
3) Urea;
4) Amide;
5) Ethylene Oxide; or
6) Mixtures of any of the above.

The size of each block (or polymeric segment) will vary depending on the final properties desired. However, each block should be substantially linear and contain on average at least 3 units of monomers and have a number average molecular weight greater than 300. In preferred embodiments, the number of monomers within a single block is about 10 or more. Also in preferred embodiments, the weight average molecular weight of each block is at least 1,000, generally in a range from about 1,000-40,000, more preferably from about 1,500-30,000.

The concentration of and type of interactive functional groups on the blocks will also vary depending on the particular attribute desired; however, the concentration of interactive groups should be such that at least 1% to 100%, more preferably at least 5 to 60% by weight, of the monomers used to form that given block have interactive functional groups.

In the present invention, it is particularly useful to concentrate the interactive functional groups on the outer blocks (or A and A' blocks), with the remaining inner block (or B block) containing essentially no functional groups. This construction particularly facilitates the network formation attribute desired. By "essentially no" functional groups or "essentially free" of functional groups, it is meant that the B block should contain less than 1% by weight, preferably zero percent by weight, of functionalized monomers, based on the total weight of the block copolymer.

As will be appreciated by those skilled in the art, it may also sometimes be desirable to have crosslinkable groups, such as hydroxyl groups (which can serve a dual function of H-bonding and crosslinking) or amine groups, on at least one of the blocks, preferably the outer block(s) for potential crosslinking with other binder components, for further improved film properties.

The ABA' triblock copolymer that can be used herein, as part of the binder, to replace the CAB polymer can be prepared by living polymerization methods such as anionic polymerization, group transfer polymerization (GTP), nitroxide-mediated free radical polymerization, atom transfer radical polymerization (ATRP), or reversible addition-fragmentation chain transfer (RAFT) polymerization techniques. Preferably, the polymer is prepared by the catalytic chain transfer approach for making the triblock copolymers of this invention.

Most of the other living polymerization approaches mentioned above involve special and costly raw materials including special initiating systems and high purity monomers. Some of them have to be carried out under extreme conditions such as low moisture or low temperature. Furthermore, some of these methods are sensitive to the active hydrogen groups on the monomers that are key to our invention such as the hydroxyl and carboxylic acid groups. These groups would have to be chemically protected during the polymerization and recovered in a subsequent step. In addition, some of the initiating systems bring undesirable color, odor, metal complexes, or potentially corrosive halides into the product. Extra steps would be required to remove them. In the preferred method, the catalyst is used at extremely low concentration and has minimum impact on the quality of the product, and the synthesis can be conveniently accomplished in a one-pot process.

In the catalytic chain transfer agent approach or "macromonomer" approach, the triblock copolymers are most conveniently prepared by a multi-step free radical polymerization process. Such a process is taught, for example in U.S. Pat. No. 6,291,620 to Moad et al., hereby incorporated by reference in its entirety.

In the first step of the macromonomer process, the first or outer block A of the triblock copolymer is formed using a free radical polymerization method wherein ethylenically unsaturated monomers or monomer mixtures chosen for this block are polymerized in the presence of cobalt catalytic chain transfer agents or other transfer agents that are capable of terminating the free radical polymer chain and forming a "macromonomer" with a terminal polymerizable double bond in the process. The polymerization is preferably carried out at elevated temperature in an organic solvent or solvent blend using a conventional free radical initiator and Co (II) or (III) chain transfer agent.

Once the first macromonomer block having the desired molecular weight and conversion is formed, the cobalt chain transfer agent is deactivated by adding a small amount of oxidizing agent such as hydroperoxide. The unsaturated monomers or monomer mixtures chosen for the next block B are then polymerized in the presence of the first block and more initiator. This step, which can be referred to as a macromonomer step-growth process, is likewise carried out at elevated temperature in an organic solvent or solvent blend using a conventional polymerization initiator. Polymerization is continued until a macromonomer is formed of the desired molecular weight and desired conversion of the second block into a diblock macromonomer. The third block A' or other outer block of the triblock copolymer is then added onto it in the same manner to produce the triblock copolymers of this invention.

Preferred cobalt chain transfer agents are described in U.S. Pat. No. 4,680,352 to Janowicz et al and U.S. Pat. No. 4,722,984 to Janowicz, hereby incorporated by reference in their entirety. Most preferred cobalt chain transfer agents are pentacyano cobaltate (II), diaquabis (borondifluorodimethylglyoximato) cobaltate (II), and diaquabis (borondifluorophenylglyoximato) cobaltate (II). Typically these chain transfer agents are used at concentrations of about 2-5000 ppm based on the total weight of the monomer depending upon the particular monomers being polymerized and the desired molecular weight. By using such concentrations, macromonomers having the desired molecular weight can be conveniently prepared.

To make distinct blocks, the growth of each block needs to occur to high conversion. Conversions are determined by size exclusion chromatography (SEC) via integration of polymer to monomer peak. For UV detection, the polymer response factor must be determined for each polymer/monomer polymerization mixture. Typical conversions can be 50% to 100% for each block. Intermediate conversion can lead to block copolymers with a transitioning (or tapering) segment where the monomer composition gradually changes to that of the following block as the addition of the monomer or monomer mixture of the next block continues. This may affect polymer properties such as phase separation, thermal behavior and mechanical modulus and can be intentionally exploited to drive properties for specific applications. This may be achieved by intentionally terminating the polymerization when a desired level of conversion (e.g., >80%) is reached by stopping the addition of the initiators or immediately starting the addition of the monomer or monomer mixture of the next block along with the initiator.

Typical solvents that can be used to form the triblock copolymer are alcohols, such as methanol, ethanol, n-propanol, and isopropanol; ketones, such as acetone, butanone, pentanone, and hexanone; alkyl esters of acetic, propionic, and butyric acids, such as ethyl acetate, butyl acetate, and amyl acetate; ethers, such as tetrahydrofuran, diethyl ether, and ethylene glycol and polyethylene glycol monoalkyl and dialkyl ethers such as cellosolves and carbitols; and, glycols such as ethylene glycol and propylene glycol; and mixtures thereof.

Any of the commonly used azo or peroxide type polymerization initiators can be used for preparation of the macromonomer or the triblock copolymer provided it has solubility in the solution of the solvents and the monomer mixture, and has an appropriate half life at the temperature of polymerization. "Appropriate half life" as used herein is a half-life of about 10 minutes to 4 hours. Most preferred are azo type initiators such as 2,2'-azobis (isobutyronitrile), 2,2'-azobis (2,4-dimethylvaleronitrile), 2,2'-azobis (methylbutyronitrile), and 1,1'-azobis (cyanocyclohexane). Examples of peroxy based initiators are benzoyl peroxide, lauroyl peroxide, t-butyl peroxypivalate, t-butyl peroctoate which may also be used, provided they do not adversely react with the chain transfer agents under the reaction conditions for macromonomers.

Any of the conventional acrylic monomers and optionally other ethylenically unsaturated monomers or monomer mixtures can be used to form the individual A, B and A blocks of the triblock copolymer of this invention. Depending on the preparation methods, certain monomers or monomer mixtures will work better than the others. For the preferred method of preparation for this invention, the "macromonomer" approach, methacrylate monomers must be used. Specifically, each individual block must contain at least 70 mole percent of a methacrylate monomer or methacrylate monomer mixtures. More preferred is a composition containing at least 90 mole percent of a methacrylate monomer or methacrylate monomer mixtures. The other comonomers may be of the type of acrylate, acrylamide, methacrylamide, vinyl aromatics such as styrene, and vinyl esters.

For example, monomers that may be polymerized using the methods of this invention include at least one monomer selected from the group consisting of unsubstituted or substituted alkyl acrylates, such as those having 1-20 carbon atoms in the alkyl group, alkyl methacrylate such as those having 1-20 carbon atoms in the alkyl group, cycloaliphatic acrylates, cycloaliphatic methacrylates, aryl acrylates, aryl methacrylates, other ethylenically unsaturated monomers such as acrylonitriles, methacrylonitriles, acrylamides, methacrylamides, N-alkylacrylamides, N-alkylmethacrylamides, N,N-dialkylacrylamides, N,N-dialkylmethacrylamides, vinyl aromatics such as styrene, and combinations thereof. Functionalized versions of these monomers and their relative concentrations are especially useful in differentiating the blocks, as will be discussed further hereinbelow.

In the present invention, as mentioned above, preferably the two outer blocks, A and A', contain a functional group, referred to herein as an interactive or H-bonding group, for network formation and better metallic flake control. This group will lead to the formation of a network that is connected by physical forces and is sensitive to shear force, temperature, or pH. This type of system is useful for its rheological properties such as the thixotropic behavior and parallel metallic flake orientation. Groups capable of hydrogen bonding in particular, which will be discussed further hereinbelow, may be advantageously employed for this purpose.

This group will vary depending on the nature of the other binder components present in the lacquer coating; however, carboxylic acid and other acid groups as are listed below are generally preferred.

Specific monomers or comonomers that have no special functional groups and may be used in this invention include various non-functional acrylic monomers such as methyl methacrylate, ethyl methacrylate, propyl methacrylate (all isomers), butyl methacrylate (all isomers), 2-ethylhexyl methacrylate; isobornyl methacrylate, methacrylonitrile, methyl acrylate, ethyl acrylate, propyl acrylate (all isomers), butyl acrylate (all isomers), 2-ethylhexyl acrylate, isobornyl acrylate, acrylonitrile, etc, and optionally other ethylenically unsaturated monomers, e.g., vinyl aromatics such as styrene, alpha-methyl styrene, t-butyl styrene, and vinyl toluene, etc.

To introduce interactive/H-bonding primary or secondary hydroxyl groups into the triblock copolymer, hydroxyl functional acrylic monomers can be used. Examples of hydroxyl functional acrylic monomers include hydroxyl alkyl (meth) acrylates having 1-10 atoms in the alkyl group such as 2-hydroxyethyl methacrylate (primary), hydroxypropyl methacrylate (all isomers, primary and secondary), hydroxybutyl methacrylate (all isomers, primary and secondary), 2-hydroxyethyl acrylate (primary), hydroxypropyl acrylate (all isomers, primary and secondary), hydroxybutyl acrylate (all isomers, primary and secondary), other hydroxy alkyl acrylates and methacrylates, and the like.

To introduce interactive/H-bonding acid groups into the triblock copolymer at the appropriate blocks, acid-functional monomers can be used. Carboxylic acid functional monomers are generally preferred for better compatibility with other binder components in the lacquer coating composition. The most commonly used carboxyl acid group containing monomers are methacrylic acid and acrylic acid. Others include beta-carboxyethyl acrylate, vinyl benzoic acid (all isomers), alpha-methylvinyl benzoic acid (all isomers), and the diacids such as maleic acid, fumaric acid, itaconic acid, and their anhydride form that can be hydrolyzed to the carboxylic acid groups after the polymers are made. Of course, a low level of other types of acid groups, such as sulfonic acid or phosphoric acid may be used.

The lacquer coating composition can be free from acid neutralizing agent. Examples of acid neutralizing agent can include: alkalis such as sodium hydroxide, potassium hydroxide; amines, such as triethyl amines; aminoalcohols, such as 2-dimethyaminoethanol, 2-amino-2-methyl-1-propanol; or a combination thereof.

In order to effectively use the H-bonds for building the polymer network and rheology, the acid groups such as those provided from carboxyl acid group containing monomers such as methacrylic acids and acrylic acids need to remain in the acidic form. The block co-polymer or the lacquer coating composition comprising the block co-polymer are preferred to be free from any compounds that can neutralize the acid groups to form salt such as the aforementioned neutralizing agents. The presence of such neutralizing agents in the lacquer coating composition can also have an adverse effect on humidity sensitivity of coatings formed therefrom.

Useful amide functional monomers which can be used to introduce interactive/H-bonding amide groups into the polymer include acrylamides and methacrylamides and other vinyl monomers containing either a cyclic or acyclic amide group.

Examples of acrylamide or methacrylamide monomers are represented by the formula

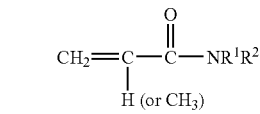

where $R^1$ and $R^2$ are each independently selected from the group consisting of hydrogen, alkyl group, aryl group, arylalkyl group, and alkylaryl group having 1 to 20 carbon atoms, and optionally containing one or more substituents that do not interfere with the polymerization process. Such substituents may include alkyl, hydroxy, amino, ester, acid, acyloxy, amide, nitrile, halogen, alkoxy, etc. Useful examples include methacrylamides such as N-methylmethacrylamide, N-ethylmethacrylamide, N-octylmethacrylamide, N-dodecylmethacrylamide, N-(isobutoxymethyl) methacrylamide, N-phenylmethacrylamide, N-benzylmethacrylamide, N,N-dimethylmethacrylamide, and the like; and acrylamides such as N-methyl acrylamide, N-ethylacrylamide, N-t-butylacrylamide, N-(isobutoxymethyl) acrylamide, N,N-dimethylacrylamide, N,N-diethylacrylamide, N,N-dibutyl acrylamide, and the like.

Examples of vinyl monomers that can be used to introduce cyclic amide groups into the copolymer include acrylic, methacrylic, acrylamide, methacrylamide, and some other vinyl monomers. The acrylic, methacrylic, acrylamide and methacrylamide monomers are represented by formula

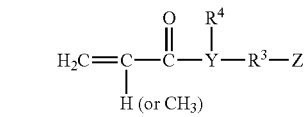

where Y is O or N, $R^3$ is selected from the group consisting of alkyl group, aryl group, arylalkyl group, and alkylaryl group having 1 to 20 carbon atoms and may contain substituents which do not interfere with polymerization such as hydroxy, amino, ester, acid, acyloxy, amide, nitrile, halogen, alkoxy, etc., $R^4$ does not exist when Y is O but when Y is N, $R^4$ is selected from the group consisting of hydrogen, alkyl group, aryl group, arylalkyl group, and alkylaryl group having 1 to 20 carbon atoms and may contain substituents which do not interfere with polymerization such as hydroxy, amino, ester, acid, acyloxy, amide, nitrile, halogen, alkoxy, etc., and Z is a radical center connected to structure (1) or (2) below.

Other vinyl monomers which can also be used to introduce the interactive cyclic amide groups are represented by formula

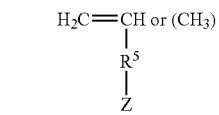

where $R^5$ is selected from the group consisting of alkyl group, aryl group, arylalkyl group, and alkylaryl group having 0 to 20 carbon atoms and may contain substituents which do not interfere with polymerization such as hydroxy, amino, ester, acid, acyloxy, amide, nitrile, halogen, alkoxy, etc., and Z is a radical center connected to structure (1) or (2) below. The most useful example is N-vinyl-2-pyrrolidinone.

Structures (1) and (2), respectively, are represented by

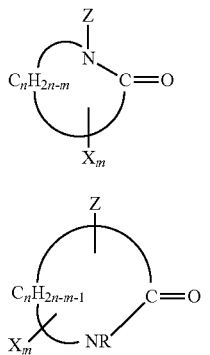

(1)

(2)

where n=3-7, preferably 3-5, m=0-3, X is a substituent on the cyclic structure and may be selected from the group consisting of alkyl group, aryl group, arylalkyl group, alkylaryl group, and heterocyclic group having 1 to 20 carbon atoms, and may contain substituents which do not interfere with polymerization such as hydroxy, amino, ester, acid, acyloxy, amide, nitrile, halogen, alkoxy, etc., R is selected from the group consisting of hydrogen, alkyl group, aryl group, arylalkyl group, and alkylaryl group having 1 to 20 carbon atoms, and may contain substituents which do not interfere with polymerization such as hydroxy, amino, ester, acid, acyloxy, amide, nitrile, halogen, alkoxy, etc., and Z is a radical center connected to the vinyl monomer structures referenced above. Examples of the heterocyclic group include triazole, triazine, imidazole, piperazine, pyridine, pyrimidine, and the like.

Useful urea functional monomers which can be used to introduce interactive/H-bonding urea groups into the polymer include acrylates methacrylates, acrylamides, methacrylamides and other vinyl monomers containing either a cyclic or a linear/acyclic urea group.

The urea containing acrylic, methacrylic, acrylamide, and methacrylamide monomers are represented by the general formula of

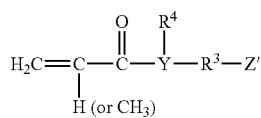

where Y, $R^3$ and $R^4$ areas described above, and Z' is a radical center connected to structure (3) below for a linear or acyclic urea group, or (4) or (5) below for a cyclic urea group.

Other vinyl monomers which can also be used to introduce either acyclic or cyclic urea group are represented by the general formula of

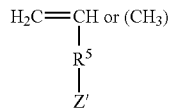

where $R^5$ is as described above, and Z' is a radical center connected to structure (3) below for a linear or acyclic urea group, or (4) or (5) for a cyclic urea group.

Structure (3), (4), and (5), respectively, are represented by

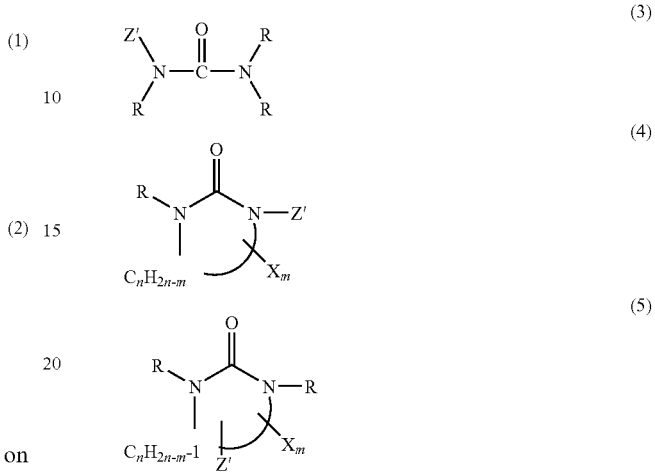

(3)

(4)

(5)

where n=0-5, preferably 2-5, m=0-3, X is a substituent on the cyclic structure and may be selected from the group consisting of alkyl group, aryl group, arylalkyl group, alkylaryl group, and heterocyclic group having 1 to 20 carbon atoms, and may contain substituents which do not interfere with polymerization such as hydroxy, amino, ester, acid, acyloxy, amide, nitrile, halogen, alkoxy, etc., each R is independently selected from the group consisting of hydrogen, alkyl group, aryl group, arylalkyl group, alkylaryl group, and heterocyclic group having 1 to 20 carbon atoms, and may contain substituents which do not interfere with polymerization such as hydroxy, amino, ester, acid, acyloxy, amide, nitrile, halogen, alkoxy, etc., and Z' is a radical center connected to the vinyl monomer structures referenced above. Examples of the heterocyclic group include triazole, triazine, imidazole, piperazine, pyridine, pyrimidine, and the like. The cyclic urea structure may also contain other heteroatoms such as O, S, N(R), or groups such as C(O), S(O)$_2$ or unsaturated double bonds, especially when n is 0 or 1. Examples of such structures include urazole, uracil, cytosine, and thymine.

Typical examples of ethylenically unsaturated urea containing monomers are described in U.S. Pat. Nos. 5,030,726 and 5,045,616, hereby incorporated by reference. Preferred monomers of this type are the acrylate, methacrylate, acrylamide or methacrylamide derivatives of 2-hydroxyethylene urea (HEEU), or 2-aminoethylethylene urea (AEEU). The most preferred monomers of this type that are commercially available include N-(2-methacryloyloxyethyl)ethylene urea and methacrylamidoethylethylene urea. Other examples of urea containing monomers can be obtained by reacting an ethylenically unsaturated monomer having an isocyanato group such as dimethyl m-isopropenylbenzyl isocyanate (m-TMI) or 2-isocyanatoethyl methacrylate (ICEMA) with a hydroxyl or amino compound having a linear or a cyclic urea group such as HEEU or AEEU. In these examples the urea group is linked to the monomer through a urethane or another urea group.

The ethylene oxide groups are capable of hydrogen-bonding with other functional groups that are also desirable for the polymer of this invention such as carboxylic acid. They can be conveniently introduced with the monomers of the general formula of

wherein n=0 or 1; when n=1, X is an alkyl, aryl, or alkaryl diradical connecting group of 1-10 carbon atoms; m=2-100, $R^6$ is H or $CH_3$, and $R^7$ is an alkyl group of 1-10 carbon atoms. Useful examples of such comonomers include 2-(2-methoxyethoxy)ethyl acrylate, 2-(2-methoxyethoxy)ethyl methacrylate, ethoxytriethyleneglycol methacrylate, methoxy polyethyleneglycol (molecular weight of 200-100) monomethacrylate, polyethyleneglycol (molecular weight 200-1000) monomethacrylate.

As indicated above, the choice of monomers and monomer mixtures for each block, the block size, overall ratios of monomers used to form the blocks, and molecular weights, and nature of each block will vary so as to provide the particular attribute desired for a particular application.

In one preferred embodiment, the ABA' block polymer contains in the A-block: methacrylic acid/2-hydroxyethyl methacrylate/ethoxy triethyleneglycol methacrylate (MAA/HEMA/ETEGMA); B-block: methyl methacrylate/butyl methacrylate (MMA/BMA); and A'-block: methyl methacrylate/butyl methacrylate/2-hydroxyethyl methacrylate/methacrylic acid (MMA/BMA/HEMA/MAA).

It should be understood that the polymer can be made starting from either end. For instance, an NBA (reverse of ABA') block polymer also can be formed and is part of this invention. In forming a NBA block polymer, the A' block is first made using the same procedure as above and then the monomers for the B block are added and after the B block is formed the monomers for the A block are added and polymerized.

The novel coating composition of the present invention generally contains as part of the binder, in the range of about 1 to 80% by weight, preferably about 5 to 60%, and even more preferably in the range of about 10 to 40% by weight of this CAB replacement polymer, all weight percentages being based on the total weight of the binder.

Other Binder Materials

In addition to the triblock copolymer described above, the coating composition can also include, as part of the binder, 0 to 98% by weight, preferably in the range of 20 to 95%, and even more preferably from 30 to 90% by weight of an acrylic polymer, polyester, alkyd resin, acrylic alkyd resin, cellulose acetate butyrate, an iminated acrylic polymer, ethylene vinyl acetate co-polymer, nitrocellulose, plasticizer or a combination thereof, all weight percentages being based on the total weight of the binder.

Useful acrylic polymers are conventionally polymerized from a monomer mixture that can include one or more of the following monomers: an alkyl acrylate; an alkyl methacrylate; a hydroxy alkyl acrylate, a hydroxy alkyl methacrylate; acrylic acid; methacrylic acid; styrene; alkyl amino alkyl acrylate; and alkyl amino alkyl methacrylate, and mixtures thereof; and one or more of the following drying oils: vinyl oxazoline drying oil esters of linseed oil fatty acids, tall oil fatty acids, and tung oil fatty acids.

Suitable iminiated acrylic polymers can be obtained by reacting acrylic polymers having carboxyl groups with propylene imine.

Useful polyesters include the esterification product of an aliphatic or aromatic dicarboxylic acid, a polyol, a diol, an aromatic or aliphatic cyclic anhydride and a cyclic alcohol. One such polyester is the esterification product of adipic acid, trimethylol propane, hexanediol, hexahydrophathalic anhydride and cyclohexane dimethylol.

Other polyesters that are useful in the present invention are branched copolyester polyols. One particularly preferred branched polyester polyol is the esterification product of dimethyloipropionic acid, pentaerythritol and epsilon-caprolactone. These branched copolyester polyols and the preparation thereof are further described in WO 03/070843 published Aug. 28, 2003, which is hereby incorporated by reference.

Suitable cellulose acetate butyrates, which may still be used, if desired, are supplied by Eastman Chemical Co., Kingsport, Tenn. under the trade names CAB-381-20 and CAB-531-1. These materials may be used in an amount of 0.1 to 20% by weight based on the weight of the binder. Preferably, however, the lacquers of this invention are free or essentially free of these materials, especially the high molecular weight, high hydroxyl number CAB resins like CAB-381-20.

A suitable ethylene-vinyl acetate co-polymer (wax) is supplied by Honeywell Specialty Chemicals—Wax and Additives, Morristown, N.J., under the trade name A-C 405 (T)-Ethylene—Vinyl Acetate Copolymer.

Suitable nitrocellulose resins preferably have a viscosity of about ½-6 seconds. Preferably, a blend of nitrocellulose resins is used. Optionally, the lacquer can contain ester gum and castor oil.

Suitable alkyd resins are the esterification products of a drying oil fatty acid, such as linseed oil and tall oil fatty acid, dehydrated castor oil, a polyhydric alcohol, a dicarboxylic acid and an aromatic monocarboxylic acid. One preferred alkyd resin is a reaction product of an acrylic polymer and an alkyd resin.

Suitable plasticizers include butyl benzyl phthalate, dibutyl phthalate, triphenyl phosphate, 2-ethylhexylbenzyl phthalate, dicyclohexyl phthalate, diallyl toluene phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethyl hexyl ester of hexamethylene diphthalate, and di(methyl cyclohexyl) phthalate. One preferred plasticizer of this group is butyl benzyl phthalate.

If desired, the lacquer can include metallic driers, chelating agents, or a combination thereof. Suitable organometallic driers include cobalt naphthenate, copper naphthenate, lead tallate, calcium naphthenate, iron naphthenate, lithium naphthenate, lead naphthenate, nickel octoate, zirconium octoate, cobalt octaoate, iron octoate, zinc octoate, and alkyl tin dilaurates, such as dibutyl tin dilaurate. Suitable chelating agents include aluminum monoisopropoxide monoversatate, aluminum (monoiospropyl)phthalate, aluminum diethoxyethoxide monoversatate, aluminum trisecondary butoxide, aluminum diisopropoxide monoacetacetic ester chelate and aluminum isopropoxide.

If the lacquer is to be used as a clearcoat for the exterior of automobiles and trucks, about 0.1 to 5% by weight, based on the weight of the total weight of the binder, of an ultraviolet light stabilizer or a combination of ultraviolet light stabilizers and absorbers can be added to improve the weatherability of the composition. These stabilizers include ultraviolet light absorbers, screeners, quenchers and specific hindered amine light stabilizers. Also, about 0.1 to 5% by weight, based on the total weight of the binder, of an antioxidant can be added. Most of the foregoing stabilizers are supplied by Ciba Specialty Chemicals, Tarrytown, N.Y.

Additional details of the foregoing additives are provided in U.S. Pat. Nos. 3,585,160, 4,242,243, 4,692,481, and U.S. Pat. No. Re 31,309, which are hereby incorporated by reference.

Pigments

If desired, the novel composition can be pigmented to form a colored mono coat, basecoat, primer or primer surfacer.

Generally, pigments are used in a pigment to binder weight ratio (P/B) of 0.1/100 to 200/100; preferably, for base coats in a P/B of 1/100 to 50/100. If used as primer or primer surfacer higher levels of pigment are used, e.g., 50/100 to 200/100. The pigments can be added using conventional techniques, such as sand-grinding, ball milling, attritor grinding, two roll milling to disperse the pigments. The mill base is blended with the film-forming constituents.

Any of the conventional pigments used in coating compositions can be utilized in the composition such as the following: metallic oxides, metal hydroxide, metal flakes, chromates, such as lead chromate, sulfides, sulfates, carbonates, carbon black, silica, talc, china clay, phthalocyanine blues and greens, organo reds, organo maroons, pearlescent pigments and other organic pigments and dyes. If desired, chromate-free pigments, such as barium metaborate, zinc phosphate, aluminum triphosphate and mixtures thereof, can also be used.

Suitable flake pigments include bright aluminum flake, extremely fine aluminum flake, medium particle size aluminum flake, and bright medium coarse aluminum flake; mica flake coated with titanium dioxide pigment also known as pearl pigments. Suitable colored pigments include titanium dioxide, zinc oxide, iron oxide, carbon black, mono azo red toner, red iron oxide, quinacridone maroon, transparent red oxide, dioxazine carbazole violet, iron blue, indanthrone blue, chrome titanate, titanium yellow, mono azo permanent orange, ferrite yellow, mono azo benzimidazolone yellow, transparent yellow oxide, isoindoline yellow, tetrachloroisoindoline yellow, anthanthrone orange, lead chromate yellow, phthalocyanine green, quinacridone red, perylene maroon, quinacridone violet, pre-darkened chrome yellow, thio-indigo red, transparent red oxide chip, molybdate orange, and molybdate orange red.

Liquid Carrier

The lacquer of the present invention can further, and typically does, contain at least one volatile organic solvent as the liquid carrier to disperse and/or dilute the above ingredients and form a coating composition having the desired properties. The solvent or solvent blends are typically selected from the group consisting of aromatic hydrocarbons, such as, petroleum naphtha or xylenes; ketones, such as, methyl amyl ketone, methyl isobutyl ketone, methyl ethyl ketone or acetone; esters, such as butyl acetate or hexyl acetate; glycol ether esters, such as, propylene glycol monomethyl ether acetate; and alcohols, such as isopropanol and butanol. The amount of organic solvent added depends upon the desired solids level, desired rheological (e.g., spray) properties, as well as the desired amount of VOC of the lacquer.

The lacquer coating composition can comprise in a range of from 0% to 5% of water, preferably in a range of from 0% to 4% of water, further preferably in a range of from 0% to 3% of water, even preferably in a range of from 0% to 2% of water, even further preferably in a range of from 0% to 1% of water. In one example, the lacquer coating composition comprises 0% of water. In another example, the lacquer coating composition comprises 0% to 5% of water. In yet another example, the lacquer coating composition comprises 0% to 1% of water.

The total solids level of the coating of the present invention can vary in the range of from 5 to 95%, preferably in the range of from 7 to 80% and more preferably in the range of from 10 to 60%, all percentages being based on the total weight of the coating composition.

Optional Crosslinking Component

If the novel composition is used as a clear coating composition, a crosslinking component is generally known to provide the improved level of durability and weatherability required for automotive and truck topcoats. Typically, polyisocyanates are used as the crosslinking agents. Suitable polyisocyanate has on average 2 to 10, alternately 2.5 to 8 and further alternately 3 to 8 isocyanate functionalities. Typically the coating composition has, in the binder, a ratio of isocyanate groups on the polyisocyanate in the crosslinking component to crosslinkable groups (e.g., hydroxyl and/or amine groups) of the branched acrylic polymer ranges from 0.25/1 to 3/1, alternately from 0.8/1 to 2/1, further alternately from 1/1 to 1.8/1.

Examples of suitable polyisocyanates include any of the conventionally used aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate; uretidiones of hexamethylene diisocyanate; uretidiones of isophorone diisocyanate or isophorone diisocyanate; isocyanurate of meta-tetramethylxylylene diisocyanate; and a diol such as, ethylene glycol.

Polyisocyanates functional adducts having isocyanaurate structural units can also be used, for example, the adduct of 2 molecules of a diisocyanate, such as, hexamethylene diisocyanate or isophorone diisocyanate, and a diol such as ethylene glycol; the adduct of 3 molecules of hexamethylene diisocyanate and 1 molecule of water (available under the trademark Desmodur® N from Bayer Corporation of Pittsburgh, Pa.); the adduct of 1 molecule of trimethylol propane and 3 molecules of toluene diisocyanate (available under the trademark Desmodur® L from Bayer Corporation); the adduct of 1 molecule of trimethylol propane and 3 molecules of isophorone diisocyanate or compounds, such as 1,3,5-triisocyanato benzene and 2,4,6-triisocyanatotoluene; and the adduct of 1 molecule of pentaerythritol and 4 molecules of toluene diisocyanate.

The coating composition containing a crosslinking component preferably includes one or more catalysts to enhance crosslinking of the components on curing. Generally, the coating composition includes in the range of from 0.01 to 5% by weight, based on the total weight of the binder.

Suitable catalysts for polyisocyanate can include one or more tin compounds, tertiary amines or a combination thereof. Suitable tin compounds include dibutyl tin dilaurate, dibutyl tin diacetate, stannous octoate, and dibutyl tin oxide. Dibutyl tin dilaurate is preferred. Suitable tertiary amines include triethylene diamine. One commercially available catalyst that can be used is Fastcat® 4202 dibutyl tin dilaurate sold by Elf-Atochem North America, Inc. Philadelphia, Pa. Carboxylic acids, such as acetic acid, may be used in conjunction with the above catalysts to improve the viscosity stability of two component coatings.

Application

In use, a layer of the novel composition is typically applied to a substrate by conventional techniques, such as, spraying, electrostatic spraying, roller coating, dipping or brushing. Spraying and electrostatic spraying are preferred application methods. When used as a pigmented coating composition, e.g., as a basecoat or a pigmented top coat, the coating thickness can range from 10 to 85 micrometers, preferably from 12 to 50 micrometers and when used as a primer, the coating thickness can range from 10 to 200 micrometers, preferably from 12 to 100 micrometers. When used as a clear coating, the thickness is in the range of from 25 micrometers to 100 micrometers. The coating composition can be dried at ambient temperatures or can be dried upon application for about 2 to 60 minutes at elevated drying temperatures ranging from about 50° C. to 100° C.

In a typical clearcoat/basecoat application, a layer of conventional clear coating composition is applied over the basecoat of the novel composition of this invention by the above conventional techniques, such as, spraying or electrostatic spraying. Generally, a layer of the basecoat is flashed for 1 minute to two hours under ambient or elevated temperatures before the application of the clear coating composition or dried at elevated temperatures shown above. Suitable clear coating compositions can include two-pack isocyanate crosslinked compositions, such as 72200S ChromaPremier® Productive Clear blended with an activator, such as 12305S ChromaPremier® Activator, or 3480S Low VOC Clear composition activated with 194S Imron Select® Activator. Isocyanate free crosslinked clear coating compositions, such as 1780S Iso-Free Clearcoat activated with 1782S Converter and blended with 1775S Mid-Temp Reducer are also suitable. Suitable clear lacquers can include 480S Low VOC Ready to Spray Clear composition. All the foregoing clear coating compositions are supplied by DuPont (E.I. Dupont de Nemours and Company, Wilmington, Del.).

If the coating composition of the present invention contains a crosslinking agent, such as a polyisocyanate, the coating composition can be supplied in the form of a two-pack coating composition in which the first-pack includes the branched acrylic polymer and the second pack includes the crosslinking component, e.g., a polyisocyanate. Generally, the first and the second packs are stored in separate containers and mixed before use. The containers are preferably sealed air tight to prevent degradation during storage. The mixing may be done, for example, in a mixing nozzle or in a container. When the crosslinking component contains, e.g., a polyisocyanate, the curing step can take place under ambient conditions, or if desired, it can take place at elevated baking temperatures.

For a two pack coating composition, the two packs are mixed just prior to use or 5 to 30 minutes before use to form a potmix. A layer of the potmix is typically applied to a substrate by the above conventional techniques. If used as a clear coating, a layer is applied over a metal substrate, such as, automotive body, which is often pre-coated with other coating layers, such as, an electrocoat primer, primer surfacer and a basecoat. The two-pack coating composition may be dried and cured at ambient temperatures or may be baked upon application for 10 to 60 minutes at baking temperatures ranging from 80° C. to 160° C. The mixture can also contain pigments and can be applied as a mono coat or a basecoat layer over a primed substrate or as a primer layer.

The coating composition of the present invention is suitable for providing coatings on variety of substrates. Typical substrates, which may or may not be previously primed or sealed, for applying the coating composition of the present invention include automobile bodies, any and all items manufactured and painted by automobile sub-suppliers, frame rails, commercial trucks and truck bodies, including but not limited to beverage bottles, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, bicycles, boats, and aircraft. The substrate further includes industrial and commercial new construction and maintenance thereof; cement and wood floors; walls of commercial and residential structures, such office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; golf balls; and sporting equipment.

The novel compositions of this invention are also suitable as clear or pigmented coatings in industrial and maintenance coating applications.

These and other features and advantages of the present invention will be more readily understood, by those of ordinary skill in the art from the following examples. In the examples, all parts and percentages are on a weight basis unless otherwise noted.

EXAMPLES

The following ABA' triblock copolymer were prepared from the following macromonomers and then used to form lacquer coating compositions.

Example 1

Preparation of MAA/HEMA/ETEGMA Macromonomer, 60/20/20% by Weight

This example illustrates the preparation of a macromonomer with carboxyl groups, primary hydroxyl groups, and polyethylene oxide groups that are capable of forming hydrogen bonds and can be used to form the A block (outer block) of a triblock copolymer of this invention. A 5-liter flask was equipped with a thermometer, stirrer, additional funnels, heating mantel, reflux condenser and a means of maintaining a nitrogen blanket over the reactants. The flask was held under nitrogen positive pressure and the following ingredients were employed.

| | Weight (gram) |
|---|---|
| Portion 1 | |
| Methyl ethyl ketone | 850.0 |
| Isopropanol | 990.0 |
| Portion 2 | |
| Diaquabis(borondifluorodiphenyl glyoximato) cobaltate (II), Co(DPG-BF$_2$) | 0.48 |
| Acetone | 106.4 |
| Portion 3 | |
| 2,2'-Azobis(methylbutyronitrile) (Vazo ® 67 by DuPont Co., Wilmington, DE) | 21.6 |
| Methyl ethyl ketone | 260.0 |
| Portion 4 | |
| Methacrylic acid (MAA) | 720.0 |
| 2-Hydroxyethyl methacrylate (HEMA) | 240.0 |
| Ethoxy triethyleneglycol methacrylate (ETEGMA) | 240.0 |
| Total | 3428.48 |

Portion 1 mixture was charged to the flask and the mixture was heated to reflux temperature and refluxed for about 20 minutes. Portion 2 was prepared by dissolving the cobalt catalyst completely. Portion 3 was added to Portion 2 and agitated to dissolve the initiator. The mixture of Portion 2 and Portion 3 was fed to the flask over 210 minutes while Portion 4 was simultaneously fed to the flask over 180 minutes, and the reaction mixture was held at reflux temperature throughout the course of additions. Reflux was continued for another 1.5 hours and the solution was cooled to room temperature and filled out.

The resulting macromonomer solution was a light yellow clear polymer solution and had a solid content of about 36.2% and a Gardner-Holtz viscosity of P. The macromonomer had a 6,390 Mw and 3,805 Mn after the carboxyl groups were protected by methyl groups to facilitate the GPC analysis.

Example 2

Preparation of an AB Diblock Macromonomer
BMA/MMA//MAA/HEMA/ETEGMA,
45/30//15/5/5% by Weight This example shows the preparation of a diblock macromonomer where the B block (center block) has no specific functional groups and the A block (one of the terminal block) contains carboxyl groups, primary hydroxyl groups, and polyethylene oxide groups from the macromonomer prepared above.

A 5-liter flask was equipped as in Example 1. The flask was held under nitrogen positive pressure and the following ingredients were employed.

|  | Weight (gram) |
|---|---|
| Portion 1 | |
| Macromonomer of Example 1 | 1257.15 |
| Isopropanol | 614.8 |
| Portion 2 | |
| Methyl methacrylate (MMA) | 528.0 |
| Butyl methacrylate (BMA) | 792.0 |
| Portion 3 | |
| t-Butyl peroctoate (Elf Atochem North America, Inc., Philadelphia, PA) | 28.0 |
| Ethyl acetate | 300.0 |
| Total | 3519.95 |

Portion 1 mixture was charged to the flask and the mixture was heated to reflux temperature and refluxed for about 10 minutes. Portion 2 was added over 3 hours and Portion 3 was simultaneously added over 3.5 hours while the reaction mixture was held at reflux temperature. The reaction mixture was refluxed for another 1.5 hours.

After cooling, the resulting macromonomer solution was a clear polymer solution and had a solid content of about 51.3% and a Gardner-Holtz viscosity of Y+1/2. The macromonomer had a 20,027 Mw and 8,578 Mn after the carboxyl groups were protected by methyl groups to facilitate the GPC analysis.

Example 3

Preparation of an ABA' Triblock Copolymer

This example shows the preparation of an ABA' triblock copolymer of this invention containing carboxyl groups, and primary hydroxyl groups on both the A and A' blocks, no specific functional groups on the center B block, specifically methyl methacrylate-co-butyl methacrylate-co-2-hydroxyethyl methacrylate-co-methacrylic acid-b-butyl methacrylate-co-methyl methacrylate-b-methacrylic acid-co-hydroxyethyl methacrylate-co-ethoxytriethyleneglycol methacrylate, 32/22/7/4//15.75/10.5//5.25/1.75/1.75% by weight, from a macromonomer prepared above.

A 12-liter flask was equipped as in Example 1. The flask was held under nitrogen positive pressure and the following ingredients were employed.

|  | Weight (gram) |
|---|---|
| Portion 1 | |
| Macromonomer of Example 2 | 2350.0 |
| Ethyl acetate | 960.0 |
| Portion 2 | |
| Methyl methacrlate (MMA) | 1075.0 |
| Butyl methacrylate (BMA) | 740.0 |
| 2-Hydroxyethyl methacrylate (HEMA) | 236.0 |
| Methacrylic acid | 135.0 |
| Portion 3 | |
| t-Butyl peroctoate (Elf Atochem North America, Inc., Philadelphia, PA) | 45.0 |
| Ethyl acetate | 1066.0 |
| Portion 4 | |
| t-Butyl peroctoate (Elf Atochem North America, Inc., Philadelphia, PA) | 4.6 |
| Ethyl acetate | 107.0 |
| Portion 5 | |
| Butyl acetate | 283.0 |
| Total | 7001.6 |

Portion 1 mixture was charged to the flask and the mixture was heated to reflux temperature and refluxed for about 10 minutes. Portion 2 and 3 were simultaneously added over 3 hours while the reaction mixture was held at reflux temperature. The reaction mixture was refluxed for 30 minutes. Portion 4 was added over 5 minutes, and the reaction mixture was refluxed for another 2 hours. Portion 5 was added toward the end of the reflux.

After cooling, the resulting ABA' triblock copolymer solution was slightly hazy and had a solid content of about 50.2% and a Gardner-Holtz viscosity of Z1. The triblock copolymer had a relatively narrow distribution of molecular weight with 28,146 Mw and 12,176 Mn, and a very high Tg of 110 C measured by Differential Scanning Calorimetry.

Example 4

Preparation of an ABA' Triblock Copolymer

This example shows the preparation of an ABA' triblock copolymer of this invention containing urea groups, primary hydroxyl groups, and polyethylene oxide groups on one terminal block, and carboxyl groups and primary hydroxyl groups on the other, and no specific functional groups on the center B block, specifically methyl methacrylate-co-N-(2-methacryloyloxyethyl)ethylene urea-co-butyl methacrylate-co-hydroxyethyl methacrylate-g-butyl methacrylate-co-methyl methacrylate-b-methacrylic acid-co-hydroxyethyl methacrylate-co-ethoxytriethyleneglycol methacrylate, 33/4/20/8//15.75/10.50//5.25/1.75/1.75% by weight, from a macromonomer prepared above.

A 12-liter flask was equipped as in Example 1. The flask was held under nitrogen positive pressure and the following ingredients were employed.

| | Weight (gram) |
|---|---|
| Portion 1 | |
| Macromonomer of Example 2 | 2579.85 |
| Isopropanol | 1471.5 |
| Portion 2 | |
| Methyl methacrylate (MMA) | 773.96 |
| Butyl methacrylate (BMA) | 737.10 |
| Rohamere 6844-0 (25% N-(2-methacryloyloxyethyl)ethylene urea in MMA, Rohm Tech Inc., Malden, MA) | 589.68 |
| 2-Hydroxyethyl methacrylate (HMEA) | 294.84 |
| Portion 3 | |
| t-Butyl peroctoate (Elf Atochem North America, Inc., Philadelphia, PA) | 46.00 |
| Ethyl acetate | 980.0 |
| Portion 4 | |
| t-Butyl peroctoate (Elf Atochem North America, Inc., Philadelphia, PA) | 4.6 |
| Ethyl acetate | 98.0 |
| Portion 5 | |
| t-Butyl peroctoate (Elf Atochem North America, Inc., Philadelphia, PA) | 4.6 |
| Ethyl acetate | 98.0 |
| Total | 7678.13 |

Portion 1 mixture was charged to the flask and the mixture was heated to reflux temperature and refluxed for about 10 minutes. Portion 2 and 3 were simultaneously added over 3 hours while the reaction mixture was held at reflux temperature. The reaction mixture was refluxed for 30 minutes. Portion 4 was added over 5 minutes, and the reaction mixture was refluxed for another 30 minutes. Portion 5 was added over 5 minutes and the reaction mixture was refluxed for 2 hours. After cooling, the resulting triblock copolymer solution was slightly hazy and had a solid content of about 47.5% and a Gardner-Holtz viscosity of Z+112. The triblock copolymer had a 30,291 Mw and 13,288 Mn, and a Tg of 84.6 C measured by Differential Scanning Calorimetry.

Example 5

Preparation of an ABA' Triblock Copolymer

This example shows the preparation of an ABA' triblock copolymer of this invention containing carboxyl groups, primary hydroxyl groups, and polyethylene oxide groups on one terminal block, and hydroxyl and additional polar acetoacetate groups on the other, no specific functional groups on the center B block, specifically methyl methacrylate-co-butyl methacrylate-co-2-hydroxyethyl methacrylate-co-2-acetoacetoxyethyl methacrylate-b-butyl methacrylate-co-methyl methacrylate-b-methacrylic acid-co-hydroxyethyl methacrylate-co-ethoxytriethyleneglycol methacrylate, 33/16/8/8//15.75/10.5//5.25/1.75/1.75% by weight, from a macromonomer prepared above.

A 5-liter flask was equipped as in Example 1. The flask was held under nitrogen positive pressure and the following ingredients were employed.

| | Weight (gram) |
|---|---|
| Portion 1 | |
| Macromonomer of Example 2 | 1176.0 |
| Ethyl acetate | 533.0 |
| Portion 2 | |
| Methyl methacrlate (MMA) | 554.4 |
| Butyl methacrylate (BMA) | 268.8 |
| 2-Hydroxyethyl methacrylate (HEMA) | 134.4 |
| 2-acetoactoxyethyl methacrylate (AAEM) | 134.4 |
| Portion 3 | |
| t-Butyl peroctoate (Elf Atochem North America, Inc., Philadelphia, PA) | 20.0 |
| Ethyl acetate | 445.0 |
| Portion 4 | |
| t-Butyl peroctoate (Elf Atochem North America, Inc., Philadelphia, PA) | 2.0 |
| Ethyl acetate | 45.0 |
| Portion 5 | |
| t-Butyl peroctoate (Elf Atochem North America, Inc., Philadelphia, PA) | 2.0 |
| Ethyl acetate | 45.0 |
| Total | 3360.0 |

The procedure of Example 4 was repeated. After cooling, the resulting ABA' triblock copolymer solution was slightly hazy and had a solid content of about 51.5% and a Gardner-Holtz viscosity of Z1. The triblock copolymer had a relatively narrow distribution of molecular weight with 29,472 Mw and 13,063 Mn, and a very high Tg of 110 C measured by Differential Scanning Calorimetry.

Example 6

Preparation of an ABA' Triblock Copolymer

This example shows the preparation of an ABA' triblock copolymer of this invention containing carboxyl groups, primary hydroxyl groups, and polyethylene oxide groups on one terminal block and the primary hydroxyl groups only on the other, no specific functional groups on the center B block, specifically methyl methacrylate-co-butyl methacrylate-co-2-hydroxyethyl methacrylate-b-butyl methacrylate-co-methyl methacrylate-b-methacrylic acid-co-hydroxyethyl methacrylate-co-ethoxytriethyleneglycol methacrylate, 34/23/8//15.75/10.51/5.25/1.75/1.75% by weight, from a macromonomer prepared above.

A 5-liter flask was equipped as in Example 1. The flask was held under nitrogen positive pressure and the following ingredients were employed.

| | Weight (gram) |
|---|---|
| Portion 1 | |
| Macromonomer of Example 2 | 1146.6 |
| Isopropanol | 596.2 |
| Portion 2 | |
| Methyl methacrlate (MMA) | 556.92 |
| Butyl methacrylate (BMA) | 376.74 |
| 2-Hydroxyethyl methacrylate (HEMA) | 131.04 |
| Portion 3 | |
| t-Butyl peroctoate (Elf Atochem North America, Inc., Philadelphia, PA) | 20.0 |
| Ethyl acetate | 530.0 |

-continued

| | Weight (gram) |
|---|---|
| Portion 4 | |
| t-Butyl peroctoate (Elf Atochem North America, Inc., Philadelphia, PA) | 2.0 |
| Ethyl acetate | 53.0 |
| Total | 3412.5 |

Portion 1 mixture was charged to the flask and the mixture was heated to reflux temperature and refluxed for about 10 minutes. Portion 2 and 3 were simultaneously added over 3 hours while the reaction mixture was held at reflux temperature. The reaction mixture was refluxed for 30 minutes. Portion 4 was added over 5 minutes, and the reaction mixture was refluxed for another 2 hours.

After cooling, the resulting ABA' triblock copolymer solution was slightly hazy and had a solid content of about 47.1% and a Gardner-Holtz viscosity of Y. The triblock copolymer had a relatively narrow distribution of molecular weight with 28,679 Mw and 12,546 Mn, and a very high Tg of 76.8 C measured by Differential Scanning Calorimetry.

Paint Examples

Paint Examples BC2 to 5, BC7 to 0 and Comparative Examples BC1, BC6

The following air-drying lacquer basecoats were prepared from the following pre-blends and then tested.

The following pre-blends were made on an air mixer, adding the cellulose acetate butyrate, if employed, slowly with vigorous mixing:

Solvent Blend A

| Ingredient | Wt (grams) |
|---|---|
| n-butyl acetate | 10241.14 |
| methyl n-amyl ketone | 4389.06 |
| Total | 14630.20 |

CAB Solution B

| Ingredient | Wt (grams) |
|---|---|
| Solvent Blend A | 433.37 |
| Eastman Chemical Company CAB 381-20 | 76.48 |
| Total | 509.85 |

The ingredients were blended together on an air mixer (basecoats BC2 to BC5 use triblock acrylic copolymers of Example 3 to 6 as gram for gram solid replacements for the solid CAB in the comparative Example BC1 while BC7 to BC10 replace both the CAB and the conventional random acrylic resin in the comparative Example BC1 with the triblock acrylic copolymers of Example 3 to 6 on a solid gram for gram basis) to form the silver metallic basecoats BC1 to BC10:

| Ingredient | Batch (g) BC1 | Batch (g) BC2 | Batch (g) BC3 | Batch (g) BC4 | Batch (g) BC5 |
|---|---|---|---|---|---|
| DuPont ™ MasterTint 894J | 444.55 | 219.97 | 220.17 | 220.30 | 220.49 |
| CAB Solution B | 230.11 | 0.00 | 0.00 | 0.00 | 0.00 |
| random acrylic copolymer* | 114.71 | 56.76 | 56.81 | 56.84 | 56.89 |
| triblock copolymer of Example 3 | 0.00 | 34.02 | 0.00 | 0.00 | 0.00 |
| triblock copolymer of Example 4 | 0.00 | 0.00 | 35.99 | 0.00 | 0.00 |
| triblock copolymer of Example 5 | 0.00 | 0.00 | 0.00 | 33.22 | 0.00 |
| triblock copolymer of Example 6 | 0.00 | 0.00 | 0.00 | 0.00 | 36.35 |
| wax dispersion** | 384.42 | 190.21 | 190.39 | 190.50 | 190.66 |
| Solvent Blend A | 226.20 | 199.04 | 196.64 | 199.14 | 195.61 |
| Total | 1399.99 | 700.00 | 700.00 | 700.00 | 700.00 |

| Description | Batch (g) BC6 | Batch (g) BC7 | Batch (g) BC8 | Batch (g) BC9 | Batch (g) BC10 |
|---|---|---|---|---|---|
| DuPont ™ MasterTint 894J | 441.28 | 218.64 | 219.24 | 219.61 | 220.17 |
| CAB Solution B | 0.00 | 0.00 | 0.00 | 0.00 | 0.00 |
| random acrylic copolymer* | 171.36 | 0.00 | 0.00 | 0.00 | 0.00 |
| triblock copolymer of Example 3 | 0.00 | 100.79 | 0.00 | 0.00 | 0.00 |
| triblock copolymer of Example 4 | 0.00 | 0.00 | 106.82 | 0.00 | 0.00 |
| triblock copolymer of Example 5 | 0.00 | 0.00 | 0.00 | 98.69 | 0.00 |
| triblock copolymer of Example 6 | 0.00 | 0.00 | 0.00 | 0.00 | 108.19 |
| wax dispersion** | 381.60 | 189.07 | 189.59 | 189.91 | 190.39 |
| Solvent Blend A | 405.76 | 191.49 | 184.35 | 191.79 | 181.24 |
| Total | 1400.00 | 699.99 | 700.00 | 700.00 | 699.99 |

Table Footnotes
*A random acrylic copolymer sty/mma/ibma/hema (15/20/45/20 by weight) at 59.6% wt solids in 85/15 by wt xylene/methyl ethyl ketone (85/15) mixture was prepared with the standard free radical polymerization procedure.
**Wax & Additives AC ® 405-T is a ethylene vinyl acetate copolymer dispersion at 5.986% by wt. in a 42.43/57.57 blend by weight of xylene/n-butyl acetate, manufactured by Honeywell Specialty Chemicals.

The silver basecoats were sprayed per the application instructions used for DuPont™ ChromaPremier® Basecoat specified in the DuPont ChromaSystem Tech Manual. The basecoats were sprayed to hiding over Ecoat panels (ACT cold rolled steel 04×12×032 panels coated with Powercron 590) which were scuffed with a 3M™ Scotch-Brite™ 7777 Imperial™ Paint Prep Scuff Pad then wiped with DuPont First Klean 3900S™ and next coated with DuPont™ ChromaPremier® 42440™/42475S™ 2K Premier Sealer as per the instructions in the DuPont ChromaSystem Tech Manual.

The basecoats were then clearcoated with DuPont™ ChromaClear® V-7500S™ Multi-Use as per the instructions in the DuPont ChromaSystem Tech Manual. Basecoat/clearcoat panels were flashed and then baked in a 140° F. oven for 30 minutes. Topcoated panels were allowed to air dry for an additional 7 days prior to testing.

Below are the color readings on basecoat alone panels recorded by a DuPont ChromeVision Custom Color MA 100B meter manufactured by X-Rite, Inc. of Grandville, Mich. (flop values via calculation):

| Basecoat | Near Spec L | Near Spec A | Near Spec B | Flat L | Flat A | Flat B | High L | High A | High B | Flop |
|---|---|---|---|---|---|---|---|---|---|---|
| BC1 | 153.51 | 3.03 | 9.45 | 49.29 | 0.98 | 3.42 | 34.34 | −0.7 | −1.12 | 18.99 |
| BC2 | 150.92 | 2.9 | 6.29 | 58.67 | 0.72 | 2.38 | 38.2 | −0.65 | −0.99 | 15.37 |
| BC3 | 149.49 | 2.89 | 5.98 | 59.31 | 0.69 | 2.22 | 39.67 | −0.68 | −1 | 14.79 |
| BC4 | 150.6 | 2.89 | 6.22 | 59.09 | 0.72 | 2.26 | 38.84 | −0.68 | −1.11 | 15.13 |
| BC5 | 151.82 | 2.98 | 7.22 | 57.07 | 0.88 | 2.69 | 37.42 | −0.65 | −0.96 | 16.00 |
| BC6 | 151.56 | 2.97 | 6.98 | 57.8 | 0.76 | 2.51 | 38.09 | −0.66 | −0.96 | 15.68 |
| BC7 | 154.83 | 2.65 | 9.32 | 50.8 | 1.03 | 3.52 | 36.3 | −0.66 | −1.11 | 18.39 |
| BC8 | 155.51 | 2.28 | 9.18 | 50.48 | 1.02 | 3.59 | 35.9 | −0.69 | −1.05 | 18.68 |
| BC9 | 154.36 | 2.87 | 9.49 | 51.67 | 1 | 3.57 | 36.45 | −0.67 | −1.17 | 18.02 |
| BC10 | 153.84 | 2.95 | 9.63 | 49.64 | 1.05 | 3.39 | 35.74 | −0.66 | −1.06 | 18.69 |

None of the triblock copolymers performed as well for color using a gram for gram replacement for CAB. However, when the triblock acrylic copolymers of this invention were used as the main component of the binder in the absence of CAB (BC7 to 10), these panels gave color very comparable to that of the Comparative Example BC1 with CAB. It was also clear that the conventional random acrylic resin as a main binder component in the Comparative Example BC6 did not fair well for color (especially flop) vs. the Comparative Example BC1 containing CAB.

Below are the color readings on basecoat/clearcoat panels recorded by the same instrument:

| Basecoat | Near Spec L | Near Spec A | Near Spec B | Flat L | Flat A | Flat B | High L | High A | High B | Flop |
|---|---|---|---|---|---|---|---|---|---|---|
| BC1 | 148.68 | 3.86 | 9.33 | 51.3 | 0.92 | 3.14 | 33.63 | −0.66 | −1.01 | 17.65 |
| BC2 | 137.89 | 1.54 | 2.92 | 65.84 | 0.25 | 0.85 | 36.63 | −0.76 | −1.22 | 12.36 |
| BC3 | 133.64 | 1.21 | 2.47 | 66.98 | 0.16 | 0.64 | 37.36 | −0.8 | −1.37 | 11.51 |
| BC4 | 136.62 | 1.41 | 2.74 | 66.26 | 0.19 | 0.81 | 37.25 | −0.82 | −1.46 | 12.03 |
| BC5 | 135.99 | 1.31 | 2.41 | 66.79 | 0.15 | 0.6 | 36.96 | −0.79 | −1.34 | 11.91 |
| BC6 | 134.22 | 1.26 | 2.58 | 67.25 | 0.21 | 0.97 | 36.97 | −0.79 | −1.17 | 11.60 |
| BC7 | 145.46 | 2.78 | 6.03 | 57.08 | 0.6 | 1.86 | 34.97 | −0.72 | −1.16 | 15.39 |
| BC8 | 144.68 | 2.61 | 6.09 | 57.35 | 0.63 | 2.15 | 34.88 | −0.7 | −1.1 | 15.22 |
| BC9 | 145.99 | 2.76 | 6.17 | 57.13 | 0.6 | 1.96 | 35.05 | −0.71 | −1.07 | 15.45 |
| BC10 | 145.21 | 2.48 | 5.41 | 58.93 | 0.55 | 1.62 | 35.21 | −0.72 | −1.14 | 14.90 |

Below are the color readings comparing the color of the basecoat alone panels vs. those of the basecoat/clearcoat (the delta of basecoat alone readings minus the basecoat/clearcoat readings indicates the approximate amount of strike-in caused by clearcoating the panels):

| Basecoat | delta Near Spec L | delta Near Spec A | delta Near Spec B | delta Flat L | delta Flat A | delta Flat B | delta High L | delta High A | delta High B |
|---|---|---|---|---|---|---|---|---|---|
| BC1 | 4.83 | −0.83 | 0.12 | −2.01 | 0.06 | 0.28 | 0.71 | −0.04 | −0.11 |
| BC2 | 13.03 | 1.36 | 3.37 | −7.17 | 0.47 | 1.53 | 1.57 | 0.11 | 0.23 |
| BC3 | 15.85 | 1.68 | 3.51 | −7.67 | 0.53 | 1.58 | 2.31 | 0.12 | 0.37 |
| BC4 | 13.98 | 1.48 | 3.48 | −7.17 | 0.53 | 1.45 | 1.59 | 0.14 | 0.35 |
| BC5 | 15.83 | 1.67 | 4.81 | −9.72 | 0.73 | 2.09 | 0.46 | 0.14 | 0.38 |
| BC6 | 17.34 | 1.71 | 4.4 | −9.45 | 0.55 | 1.54 | 1.12 | 0.13 | 0.21 |
| BC7 | 9.37 | −0.13 | 3.29 | −6.28 | 0.43 | 1.66 | 1.33 | 0.06 | 0.05 |

-continued

| Basecoat | delta Near Spec L | delta Near Spec A | delta Near Spec B | delta Flat L | delta Flat A | delta Flat B | delta High L | delta High A | delta High B |
|---|---|---|---|---|---|---|---|---|---|
| BC8 | 10.83 | −0.33 | 3.09 | −6.87 | 0.39 | 1.44 | 1.02 | 0.01 | 0.05 |
| BC9 | 8.37 | 0.11 | 3.32 | −5.46 | 0.4 | 1.61 | 1.4 | 0.04 | −0.1 |
| BC10 | 8.63 | 0.47 | 4.22 | −9.29 | 0.5 | 1.77 | 0.53 | 0.06 | 0.08 |

In addition to the observations made on the basecoat alone panels, the delta readings indicate that none of the triblock copolymers as a gram for gram replacement for CAB provided the strike-in resistance of CAB (BC1 with CAB vs. BC2 to BC5). However, when the triblock copolymers of this invention were present as the main binder component in the absence of CAB (BC7 to BC10), the strike-in resistance was comparable to that of the basecoat containing CAB (BC1). Again, when the conventional random acrylic resin was the main binder component without CAB (BC6), the strike-in resistance was very poor.

The tables below show the results of "Dry Chip" gravelometer testing per ASTM-D-3170-87 using a 55 degree panel angle, with panels and stones kept in the freezer for a minimum of two hours prior to chipping. Each basecoat/clearcoat shows a rating and locus of failure using 1 pint or 3 pints of stones. The results of "Wet Chip" gravelometer testing per ASTM-D-3170-87 using a 55 degree panel angle, with panels and stones kept in the freezer for a minimum of two hours prior to chipping, are also included. For the "wet chip" gravelometer testing the panels were exposed in a humidity cabinet per ASTM-D-2247-92 at 100% relative humidity for 96 hours after they were air dried for 7 days after the 140° F.×30 minute bake.

|  | BC1 | BC2 | BC3 | BC4 | BC5 |
|---|---|---|---|---|---|
| Dry Chip - After 1 week AD: Gravelometer 55 deg - frozen panels Locus/Failure | | | | | |
| 1 pint stones | 0 delam | 6 BB | 6 BB | 5 BB | 5 BB |
| 3 pints stones | 0 delam | 4 BB | 2 BB | 2 BB | 1 BB |
| Wet Chip - After 1 wk AD + 96 hours in Humidity Cabinet: Gravelometer 55 deg - frozen panels Locus/Failure | | | | | |
| 1 pint stones | 0 delam | 5 BB | 5 BB | 5 BB | 5 BB |
| 3 pints stones | 0 delam | 2 BB | 2 BB | 3 BB | 1 BB |

Table Footnotes
BB = failure between layers of basecoat
delam = clean clearcoat delamination from the basecoat (no basecoat adheres to clearcoat)

The Comparative Example BC1 containing CAB showed severe clearcoat delamination while none of the replacement resins of this invention displayed this deficiency (BC2 to BC5).

|  | BC6 | BC7 | BC8 | BC9 | BC10 |
|---|---|---|---|---|---|
| Dry Chip - After 1 week AD: Gravelometer 55 deg - frozen panels Locus/Failure | | | | | |
| 1 pint stones | 5 BB | 5 BB | 5 BB | 5 BB | 5 BB |
| 3 pints stones | 0 delam | 2 BB/SE | 2 BB/SE | 3 BB | 3 BB/SE |
| Wet chip - After 1 wk AD + 96 hours in Humidity Cabinet: Gravelometer 55 deg - frozen panels Locus/Failure | | | | | |
| 1 pint stones | 5 BB | 5 BB | 5 BB | 5 BB | 5 BB |
| 3 pints stones | 0 delam | 4 BB/SE | 3 BB/SE | 4 BB | 2 BB |

Table Footnotes
BB = failure between layers of basecoat
delam = clean clearcoat delamination from the basecoat (no basecoat adheres to clearcoat)
SE = failure between sealer and Ecoat Use of the triblock copolymers of Example 3 to 6 of this invention in BC7 to BC10 eliminated the clearcoat delamination seen when using the conventional random acrylic copolymer alone in the Comparative Example BC6.

The table below shows the results of humidity cabinet testing after 96 hours exposure (ASTM D2247-92 testing water resistance of coatings in 100% relative humidity)—X-hatch adhesion, grid hatch adhesion, and blistering per ASTM D3359-92A (measuring adhesion by tape test) and ASTM D714-87 (blistering):

|  | BC1 | BC2 | BC3 | BC4 | BC5 |
|---|---|---|---|---|---|
| X hatch: | | | | | |
| Initial | 0 delam | 5 BB | 6 BB | 6 BB | 8 BB |
| Wet | 0 delam | 1 BB | 1 BB | 0 BB | 0 BB |
| 24 hrs. recovery | 0 delam | 1 BB | 0 BB | 0 BB | 1 BB |
| Grid: | | | | | |
| Initial | 0 delam | 0 BB | 0 BB | 0 BB | 0 BB |
| Wet | 0 delam | 0 BB | 0 BB | 2 BB | 1 BB |
| 24 hrs. recovery | 0 delam | 0 BB | 0 BB | 0 BB | 0 BB |
| Blistering | 10 | 10 | 10 | 10 | 10 |

Table Footnotes
BB = failure between layers of basecoat
delam = clean clearcoat delamination from the basecoat (no basecoat adheres to clearcoat)

|  | BC6 | BC7 | BC8 | BC9 | BC10 |
|---|---|---|---|---|---|
| X hatch: | | | | | |
| Initial | 7 BB | 8 BB | 9 BB | 6 BB | 9 BB |
| Wet | 0 BB | 0 BB | 6 BB | 4 BB | 5 BB |
| 24 hrs. recovery | 2 BB | 7 BB | 7 BB | 8 BB | 5 BB |
| Grid: | | | | | |
| Initial | 0 BB | 0 BB | 0 BB | 0 BB | 0 BB |
| Wet | 1 BB | 0 BB | 0 BB | 0 BB | 1 BB |
| 24 hrs. recovery | 0 BB | 0 BB | 1 BB | 0 BB | 0 BB |
| Blistering | 10 | 10 | 10 | 10 | 10 |

Table Footnotes
BB = failure between layers of basecoat

The Comparative Example BC1 containing CAB displayed severe clearcoat delamination while none of the basecoats having the replacement resins of this invention BC2 through BC5 and BC7 through BC10 on a gram for gram solid replacement basis for CAB or a total replacement of CAB and the conventional random acrylic resin did.

Various modifications, alterations, additions or substitutions of the compositions and processes of this invention will be apparent to those skilled in the art without departing from the spirit and scope of this invention. This invention is not limited by the illustrative embodiments set forth herein, but rather is defined by the following claims.

What is claimed is:

1. A lacquer coating composition comprising an ABA'-block copolymer and a volatile organic liquid carrier, wherein the block copolymer has a weight average molecular weight of about 5,000 to 200,000 and contains a polymeric A block, a polymeric B block, and a polymeric A' block: wherein
    (a) the polymeric A block is of polymerized ethylenically unsaturated monomer(s) comprising one or more monomers having one or more interactive functional groups;
    (b) the polymeric B block is of a polymerized ethylenically unsaturated monomer(s); and
    (c) the polymeric A' block is of polymerized ethylenically unsaturated monomer(s) comprising one or more monomers having one or more interactive functional groups; and further wherein
    the A and A' blocks have the same or similar composition and the B block has a different composition from the A and A' blocks;
    the A and A' blocks differ from the B block by the presence of one or more of said interactive functional groups from said one or more monomers that are capable of interacting with each other for the formation of a reversible network and the B-block is a non-functional block and essentially free of said interactive functional groups; and
    the volatile organic liquid carrier consists of a solvent or solvent blends selected from the group consisting of aromatic hydrocarbons, esters, glycol ether esters, methyl n-amyl ketone, methyl isobutyl ketone, methyl ethyl ketone, and a combination thereof;
    wherein the A block contains at least three different interactive functional groups selected from the group consisting of carboxylic acid, hydroxyl, urea, amide, ethylene oxide groups, and any mixtures thereof, with the proviso that at least one of the at least three different interactive functional groups is urea or amide, or any mixture thereof;
    wherein the A' block contains at least two different interactive functional groups selected from the group consisting of carboxylic acid, hydroxyl, ethylene oxide groups, and any mixtures thereof;
    each of said A, B and A' block contains at least 70 mole percent of a methacrylate monomer or methacrylate monomer mixtures, and
    said lacquer coating composition comprises 0% to 5% of water.

2. The lacquer coating composition of claim 1, wherein at least 1% by weight of the monomers used to form the A and A' blocks contain said interactive functional groups.

3. The lacquer coating composition of claim 1, wherein about 5 to 60% by weight of the monomers used to form the functional blocks A and A' contain said interactive functional groups.

4. The lacquer coating composition of claim 1, wherein the blocks are linearly attached to each other in the order given, each at a single terminal point thereof.

5. The lacquer coating composition of claim 1, wherein the ABA' block copolymer is prepared by a macromonomer approach using cobalt as a catalytic chain transfer agent.

6. The lacquer coating composition of claim 1, wherein the block copolymer is made from solely methacrylic monomers.

7. The lacquer coating composition of claim 1, wherein said volatile organic liquid carrier is about 10-95% by weight of said lacquer coating composition.

8. The lacquer coating composition of claim 1 further comprising an acrylic polymer, polyester, a highly branched copolyester polyol, alkyd resin, acrylic alkyd resin, cellulose acetate butyrate, an iminated acrylic polymer, ethylene-vinyl acetate co-polymer, nitrocellulose, plasticizer or a combination thereof.

9. The lacquer coating composition of claim 1 further comprising a crosslinking agent.

10. The lacquer coating composition of claim 1 further comprising metallic driers, chelating agents, or a combination thereof.

11. The lacquer coating composition of claim 1 further comprising a pigment, flake or a combination thereof.

12. The lacquer coating composition of claim 1, wherein said solvent or solvent blends are selected from the group consisting of butyl acetate, hexyl acetate, methyl n-amyl ketone, methyl isobutyl ketone, methyl ethyl ketone, petroleum naphtha, xylene, propylene glycol monomethyl ether acetate, and a combination thereof.

13. The lacquer coating composition of claim 1, wherein said lacquer coating composition is free from acid neutralizing agent.

14. The lacquer coating composition of claim 1:
    wherein the A block contains at least three different interactive functional groups that are (1) urea groups, (2) primary hydroxyl groups, and (3) polyethylene oxide groups; and
    wherein the A' block contains at least two different interactive functional groups selected that are (1) carboxyl groups and (2) primary hydroxyl groups.

15. The lacquer coating composition of claim 14:
    wherein ABA'-block copolymer comprises methyl methacrylate-co-N-(2-methacryloyloxyethyl)ethylene urea-co-butyl methacrylate-co-hydroxyethyl methacrylate-b-butyl methacrylate-co-methyl methacrylate-b-methacrylic acid-co-hydroxyethyl methacrylate-co-ethoxytriethyleneglycol methacrylate.

16. The lacquer coating claim 15, wherein the polymeric constituents of the ABA'-block copolymer are provided in the following percentages by weight of the overall ABA' block copolymer: 33/4/20/8//15.75/10.50//5.25/1.75/1.75.

17. A process for producing a coating on the surface of a substrate, said process comprising:
    applying a layer of a lacquer of claim 1 on said surface; and
    drying said layer to form said coating on said surface of said substrate.

18. The process of claim 17, further comprising applying a layer of clear coating composition over said layer of said lacquer.

19. The process of claim 17, wherein said lacquer is a pigmented basecoat composition.

20. The process of claim 17, wherein said drying step takes place under ambient conditions.

21. The process of claim 17, wherein said drying step takes place at elevated temperatures.

22. The process of claim 17, wherein said lacquer is a pigmented basecoat or a clearcoat composition.

* * * * *